H. R. Huling.
Mechanical Movement.
Nº 88,040. Patented Mar. 23, 1869.
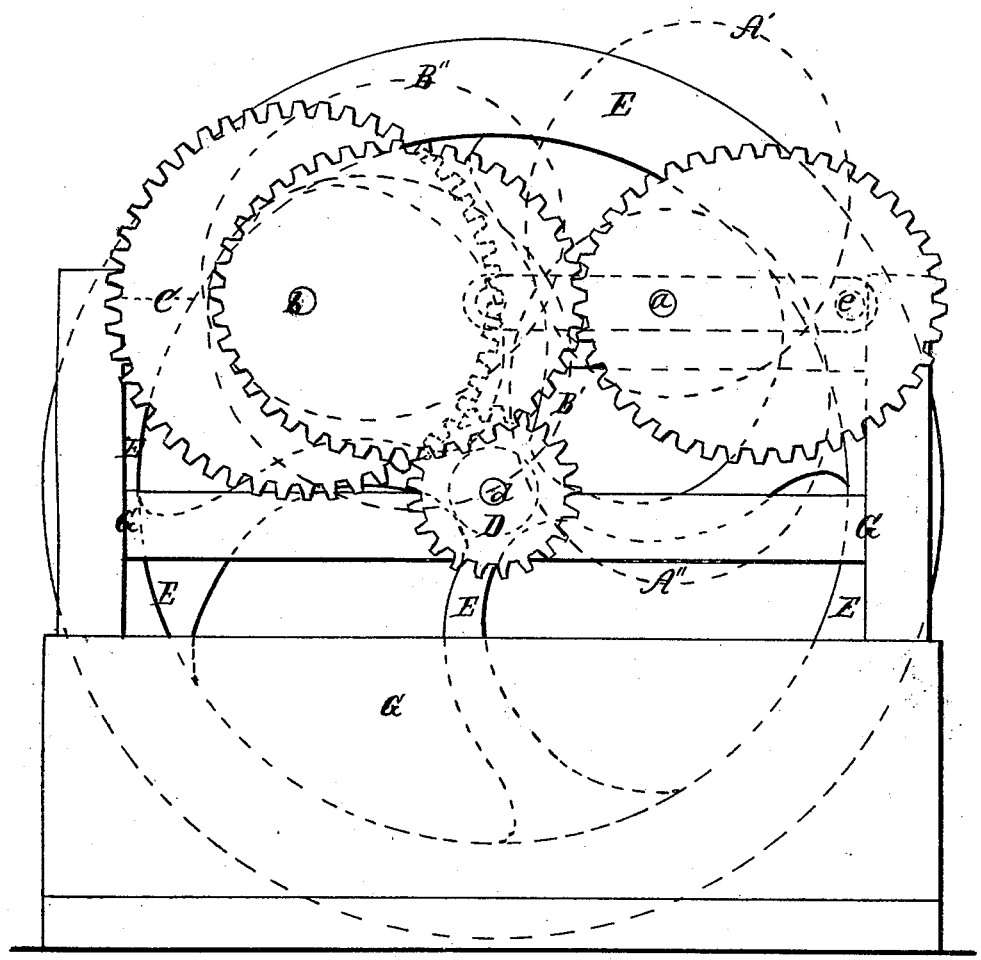
Witnesses
Wm H Jackson
Chas H Underwood,
Inventor
H. R. Huling, by
Chas F Sleeper. atty

HENRY R. HULING, OF BOSTON, MASSACHUSETTS, ASSIGNOR TO HIMSELF AND JOHN M. MARSTON, OF SAME PLACE.

Letters Patent No. 88,040, dated March 23, 1869; antedated March 10, 1869.

IMPROVEMENT IN MECHANICAL MOVEMENT.

The Schedule referred to in these Letters Patent and making part of the same

*To all whom it may concern:*

Be it known that I, HENRY R. HULING, of Boston, in the county of Suffolk, and State of Massachusetts, have invented a new and improved "Mechanical Movement;" and I do hereby declare that the following is a full, clear, and exact description of the construction and operation of the same, reference being had to the accompanying drawings, forming a part of this specification.

My invention is a new mechanical movement, by means of which I am enabled to make an advantageous and economical use of power in various mechanisms where speed is required.

To accomplish this result, I gear together two wheels, A and B, which are equal in size, elliptical in form, and are hung on the line of the transverse axes of the ellipses, at points removed from their centres.

The ellipse I use is described in the common way, dividing the transverse axis into four equal parts, and taking two points made by this division as foci.

One of these foci, I consider the best point at which to attach the wheel to the shafting.

The shafting is indicated by *a* and *b* in the drawing, the journals turning in boxes on the frame G.

To the shaft *b* is attached a wheel, C, which gears into a pinion, D, on the shaft *d*; and on the shaft *d* are also a fly-wheel, E, and a belting-pulley.

The motive-power is applied to the wheel A, on the line of its transverse axis, usually at one of the foci, as at *e* in the drawing.

I have shown, by blue lines, a strap connecting the wheels A and B; but this is not necessary to the mechanism, and only serves to hold the wheels together, in case of accident.

To illustrate the operation of this movement, I will consider it in its application to a lathe, and that the treadle of the lathe is attached, by a crank, to the wheel A, at the point *e*.

All the force exerted by a treadle is, it is well known, a direct downward pull, and the only force intended to be applied to my movement, in this illustration, is exerted from the time the wheels A and B are in the position shown by the red lines A' and B', until they arrive at that shown by the dotted red lines A" B".

While the wheel A is passing from A' to A", the leverage exerted is very great, as more than one-fourth of the circumference of the short arm of the lever-wheel A operates to the best advantage upon the same amount of circumference in the long arm of the lever-wheel B, and it consequently exerts a great degree of force upon the fly-wheel—enough, in fact, to enable the fly-wheel to carry the wheel A around to the position A', in readiness for another operation of the treadle; but, in fact, the fly-wheel is assisted by the weight of the wheel B, for, when the wheels A and B are reversed from the position shown in the drawing, the short arm of the lever-wheel B is engaged with the long arm of the lever-wheel A, and gives the power of its leverage, to throw the wheel A, during a little more than one-fourth of its revolution.

It will thus be seen that the wheel A exerts its force only at the point where it can be used to the best advantage, and that it is readily brought into position for repeated action.

When much speed is required, the treadle can be attached so as to give its stroke when the longest arm of the lever-wheel A is between the points *a* and *b*. In this case, the direction of the motion is reversed, and much more power is required upon the treadle; but, to compensate for this, the stroke of the treadle operates upon more than two-thirds of the circumference, and it is almost instantly brought up, in readiness for another stroke.

In this application of power, the stroke of the treadle is slow, and almost continuous, while in that previously described, its stroke is quicker, and more powerful, but of less duration.

I have explained my mechanism as operated on a lathe, that being a simple form in which to show it, and sufficing to give to any skilled mechanic a knowledge of its construction and operation; but it is obvious that it can be applied to other machines.

By applying power to the fly-wheel, or wheel C, this mechanism can be used to give an alternate quick and slow movement in certain machines, similar to that now procured by means of two elliptical wheels hung on the centres of their axes; but it is evident that only one alternation can take place at each revolution of my mechanism, while there are two alternations with each revolution of the other.

Having thus described my invention,

What I claim as new, and desire to secure by Letters Patent, is—

The combination of the elliptical wheels A and B with other mechanism, substantially as and for the purpose specified.

HENRY R. HULING.

Witnesses:
S. A. BOLSTER,
GILES H. RICH.